United States Patent
Staubach et al.

(10) Patent No.: US 10,550,768 B2
(45) Date of Patent: Feb. 4, 2020

(54) INTERCOOLED COOLED COOLING INTEGRATED AIR CYCLE MACHINE

(71) Applicant: UNITED TECHNOLOGIES CORPORATION, Farmington, CT (US)

(72) Inventors: Joseph B. Staubach, Colchester, CT (US); Nathan Snape, Tolland, CT (US)

(73) Assignee: United Technologies Corporation, Farmington, CT (US)

(*) Notice: Subject to any disclaimer, the term of this patent is extended or adjusted under 35 U.S.C. 154(b) by 364 days.

(21) Appl. No.: 15/346,206

(22) Filed: Nov. 8, 2016

(65) Prior Publication Data
US 2018/0128176 A1    May 10, 2018

(51) Int. Cl.
*F02C 7/143* (2006.01)
*F02C 7/18* (2006.01)
(Continued)

(52) U.S. Cl.
CPC .............. *F02C 7/143* (2013.01); *F02C 7/185* (2013.01); *B64D 13/06* (2013.01); *F02C 6/08* (2013.01);
(Continued)

(58) Field of Classification Search
CPC . B64D 13/06; B64D 2013/0611; F02C 7/141; F02C 7/143; F02C 7/185; F02C 6/08
See application file for complete search history.

(56) References Cited

U.S. PATENT DOCUMENTS

| 2,692,476 A | 10/1954 | Schaal et al. |
| 3,878,677 A | 4/1975 | Colvin |
| (Continued) | | |

FOREIGN PATENT DOCUMENTS

| DE | 2852057 | 6/1979 |
| EP | 0447886 | 9/1991 |
| (Continued) | | |

OTHER PUBLICATIONS

International Search Report and Written Opinion for PCT Application No. PCT/US2017/060587, dated Feb. 20, 2018.
(Continued)

*Primary Examiner* — Steven M Sutherland
*Assistant Examiner* — James P McGlynn
(74) *Attorney, Agent, or Firm* — Carlson, Gaskey & Olds, P.C.

(57) ABSTRACT

An intercooled cooling system for a gas turbine engine is provided. The intercooled cooling system includes cooling stages in fluid communication with an air stream utilized for cooling. A first cooling stage is fluidly coupled to a bleed port of the gas turbine engine to receive and cool bleed air with the air stream to produce a cool bleed air. The intercooled cooling system includes a pump fluidly coupled to the first cooling stage to receive and increase a pressure of the cool bleed air to produce a pressurized cool bleed air. A second cooling stage is fluidly coupled to the pump to receive and cool the pressurized cool bleed air to produce an intercooled cooling air. The intercooled cooling system includes an air cycle machine in fluid communication to outputs of the cooling stages to selectively receive the cool bleed air or the intercooled cooling air.

9 Claims, 3 Drawing Sheets

(51) Int. Cl.
*B64D 13/06* (2006.01)
*F02C 6/08* (2006.01)

(52) U.S. Cl.
CPC .. *F05D 2260/211* (2013.01); *F05D 2260/213* (2013.01)

(56) References Cited

U.S. PATENT DOCUMENTS

| | | | |
|---|---|---|---|
| 4,254,618 A | 3/1981 | Elovic | |
| 4,539,945 A | 9/1985 | Bosisio | |
| 4,882,902 A | 11/1989 | Reigel et al. | |
| 5,056,335 A | 10/1991 | Renninger et al. | |
| 5,269,135 A | 12/1993 | Vermejan et al. | |
| 5,305,616 A | 4/1994 | Coffinberry | |
| 5,392,614 A | 2/1995 | Coffinberry | |
| 5,414,992 A | 5/1995 | Glickstein | |
| 5,442,905 A * | 8/1995 | Claeys | B64D 13/06 454/71 |
| 5,452,573 A | 9/1995 | Glickstein et al. | |
| 5,498,126 A | 3/1996 | Pighetti et al. | |
| 5,724,806 A | 3/1998 | Horner | |
| 5,758,485 A | 6/1998 | Frutschi | |
| 5,867,979 A | 2/1999 | Newton et al. | |
| 5,918,458 A | 7/1999 | Coffinberry et al. | |
| 6,050,079 A | 4/2000 | Durgin et al. | |
| 6,065,282 A | 5/2000 | Fukue et al. | |
| 6,134,880 A | 10/2000 | Yoshinaka | |
| 6,427,471 B1 * | 8/2002 | Ando | B64D 13/06 62/402 |
| 6,430,931 B1 | 8/2002 | Horner | |
| 6,487,863 B1 | 12/2002 | Chen et al. | |
| 6,612,114 B1 | 9/2003 | Klingels | |
| 6,892,523 B2 | 5/2005 | Fetescu et al. | |
| 7,237,386 B2 | 7/2007 | Hoffmann et al. | |
| 7,246,484 B2 | 7/2007 | Giffin, III et al. | |
| 7,284,377 B2 | 10/2007 | Joshi et al. | |
| 7,306,424 B2 | 12/2007 | Romanov et al. | |
| 7,334,412 B2 | 2/2008 | Tiemann | |
| 7,347,637 B2 | 3/2008 | Kubo et al. | |
| 7,500,365 B2 | 3/2009 | Suciu et al. | |
| 7,552,591 B2 | 6/2009 | Bad et al. | |
| 7,698,884 B2 | 4/2010 | Maguire et al. | |
| 7,765,788 B2 | 8/2010 | Schwarz | |
| 7,823,389 B2 | 11/2010 | Seltzer et al. | |
| 7,882,691 B2 | 2/2011 | Lemmers, Jr. et al. | |
| 7,886,520 B2 | 2/2011 | Stretton et al. | |
| 8,015,828 B2 | 9/2011 | Moniz et al. | |
| 8,037,686 B2 | 10/2011 | Lasker | |
| 8,087,249 B2 | 1/2012 | Ottaviano et al. | |
| 8,181,443 B2 | 5/2012 | Rago | |
| 8,307,662 B2 | 11/2012 | Turco | |
| 8,350,398 B2 | 1/2013 | Butt | |
| 8,397,487 B2 | 3/2013 | Sennoun et al. | |
| 8,402,742 B2 | 3/2013 | Roberge et al. | |
| 8,434,997 B2 | 5/2013 | Pinero et al. | |
| 8,511,967 B2 | 8/2013 | Suciu et al. | |
| 8,522,529 B2 | 9/2013 | Martinou et al. | |
| 8,572,982 B2 | 11/2013 | Tiemann | |
| 8,602,717 B2 | 12/2013 | Suciu et al. | |
| 8,621,871 B2 | 1/2014 | McCune et al. | |
| 8,727,703 B2 | 5/2014 | Laurello et al. | |
| 8,776,952 B2 | 7/2014 | Schwarz et al. | |
| 8,814,502 B2 | 8/2014 | Eleftheriou | |
| 8,876,465 B2 | 11/2014 | Stretton | |
| 8,961,108 B2 | 2/2015 | Bergman et al. | |
| 9,234,481 B2 | 1/2016 | Suciu et al. | |
| 9,243,563 B2 | 1/2016 | Lo | |
| 9,255,492 B2 | 2/2016 | Bacic | |
| 9,297,391 B2 | 3/2016 | Rued et al. | |
| 9,422,063 B2 | 8/2016 | Diaz | |
| 9,429,072 B2 | 8/2016 | Diaz et al. | |
| 9,797,314 B2 * | 10/2017 | Hillel | F02C 3/04 |
| 2003/0046938 A1 | 3/2003 | Mortzheim et al. | |
| 2004/0088995 A1 | 5/2004 | Reissig | |
| 2005/0172612 A1 | 8/2005 | Yamanaka et al. | |
| 2006/0059942 A1 * | 3/2006 | McAuliffe | B64D 13/06 62/402 |
| 2007/0022735 A1 | 2/2007 | Henry et al. | |
| 2007/0144176 A1 | 6/2007 | Joshi et al. | |
| 2007/0213917 A1 | 9/2007 | Bruno et al. | |
| 2007/0245738 A1 | 10/2007 | Stretton et al. | |
| 2008/0028763 A1 | 2/2008 | Schwarz et al. | |
| 2008/0230651 A1 | 9/2008 | Porte | |
| 2008/0253881 A1 | 10/2008 | Richards | |
| 2009/0007567 A1 | 1/2009 | Porte et al. | |
| 2009/0090096 A1 | 4/2009 | Sheridan | |
| 2009/0145102 A1 | 6/2009 | Roberge et al. | |
| 2009/0196736 A1 | 8/2009 | Sengar et al. | |
| 2009/0226297 A1 | 9/2009 | Yanagi et al. | |
| 2009/0272120 A1 | 11/2009 | Tiemann | |
| 2010/0043396 A1 | 2/2010 | Coffinberry | |
| 2010/0154434 A1 | 6/2010 | Kubota et al. | |
| 2011/0036066 A1 | 2/2011 | Zhang et al. | |
| 2011/0088405 A1 | 4/2011 | Turco | |
| 2011/0120083 A1 | 5/2011 | Giffin et al. | |
| 2011/0247344 A1 | 10/2011 | Glahn et al. | |
| 2012/0067055 A1 | 3/2012 | Held | |
| 2012/0102915 A1 | 5/2012 | Baltas | |
| 2012/0159961 A1 | 6/2012 | Krautheim et al. | |
| 2012/0180509 A1 | 7/2012 | DeFrancesco | |
| 2013/0036747 A1 | 2/2013 | Fuchs et al. | |
| 2013/0067928 A1 | 3/2013 | Arias Chao et al. | |
| 2013/0098059 A1 | 4/2013 | Suciu et al. | |
| 2013/0145744 A1 | 6/2013 | Lo et al. | |
| 2013/0145774 A1 | 6/2013 | Duong et al. | |
| 2013/0186102 A1 | 7/2013 | Lo | |
| 2013/0187007 A1 * | 7/2013 | Mackin | F02C 6/08 244/134 R |
| 2013/0199156 A1 | 8/2013 | Ress, Jr. et al. | |
| 2013/0239583 A1 | 9/2013 | Suciu et al. | |
| 2013/0283848 A1 | 10/2013 | Czechowski | |
| 2013/0319002 A1 | 12/2013 | Sidelkovskiy et al. | |
| 2014/0020506 A1 | 1/2014 | Duong | |
| 2014/0137417 A1 | 5/2014 | Silberberg et al. | |
| 2014/0196469 A1 | 7/2014 | Finney et al. | |
| 2014/0230444 A1 | 8/2014 | Hao et al. | |
| 2014/0250898 A1 | 9/2014 | Mackin et al. | |
| 2014/0260326 A1 | 9/2014 | Schwarz et al. | |
| 2014/0311157 A1 | 10/2014 | Laurello et al. | |
| 2014/0341704 A1 | 11/2014 | Fletcher | |
| 2014/0352315 A1 | 12/2014 | Diaz | |
| 2015/0114611 A1 | 4/2015 | Morris et al. | |
| 2015/0275769 A1 | 10/2015 | Foutch et al. | |
| 2015/0285147 A1 | 10/2015 | Phillips et al. | |
| 2015/0308339 A1 | 10/2015 | Forcier | |
| 2015/0330236 A1 | 11/2015 | Beecroft et al. | |
| 2015/0354465 A1 | 12/2015 | Suciu et al. | |
| 2015/0354822 A1 | 12/2015 | Suciu et al. | |
| 2016/0010554 A1 | 1/2016 | Suciu et al. | |
| 2016/0131036 A1 | 5/2016 | Bintz et al. | |
| 2016/0131037 A1 | 5/2016 | Spangler et al. | |
| 2016/0169118 A1 | 6/2016 | Duong | |
| 2016/0215732 A1 | 7/2016 | Malecki | |
| 2016/0237906 A1 | 8/2016 | Suciu et al. | |
| 2016/0281604 A1 | 9/2016 | Freund | |
| 2016/0312711 A1 | 10/2016 | Suciu et al. | |
| 2016/0312797 A1 | 10/2016 | Suciu et al. | |
| 2016/0341125 A1 | 11/2016 | Kraft et al. | |
| 2016/0369697 A1 | 12/2016 | Schwarz et al. | |
| 2017/0009657 A1 | 1/2017 | Schwarz et al. | |
| 2017/0044980 A1 | 2/2017 | Duesler et al. | |
| 2017/0044982 A1 | 2/2017 | Duesler et al. | |
| 2017/0106985 A1 * | 4/2017 | Stieger | B64D 13/06 |
| 2017/0152765 A1 | 6/2017 | Uechi et al. | |
| 2017/0159568 A1 | 6/2017 | Sennoun et al. | |
| 2017/0167388 A1 | 6/2017 | Merry et al. | |
| 2017/0175632 A1 | 6/2017 | Hanrahan et al. | |
| 2017/0184027 A1 | 6/2017 | Moniz et al. | |
| 2017/0204787 A1 | 7/2017 | Duesler et al. | |

FOREIGN PATENT DOCUMENTS

| | | |
|---|---|---|
| EP | 0469825 | 2/1992 |
| EP | 0608142 | 7/1994 |

(56) References Cited

FOREIGN PATENT DOCUMENTS

| | | |
|---|---|---|
| EP | 0903484 | 3/1999 |
| EP | 1314872 | 5/2003 |
| EP | 1944475 | 7/2008 |
| EP | 2085599 | 8/2009 |
| EP | 2128023 | 12/2009 |
| EP | 2362081 | 8/2011 |
| EP | 2540991 | 1/2013 |
| EP | 2584172 | 4/2013 |
| EP | 2604825 | 6/2013 |
| EP | 2733322 | 5/2014 |
| EP | 2767701 A1 | 8/2014 |
| EP | 2845804 A1 | 3/2015 |
| EP | 2848534 A1 | 3/2015 |
| EP | 2865981 | 4/2015 |
| EP | 2886462 A1 | 6/2015 |
| EP | 2942490 | 11/2015 |
| EP | 2985224 A1 | 2/2016 |
| EP | 3085923 | 10/2016 |
| EP | 3085924 | 10/2016 |
| EP | 3109438 A1 | 12/2016 |
| EP | 3121411 | 1/2017 |
| EP | 3121411 A1 | 1/2017 |
| EP | 3318743 A1 | 5/2018 |
| FR | 2851295 | 8/2004 |
| GB | 1244340 | 8/1971 |
| GB | 2152148 | 7/1985 |
| JP | H1136889 | 2/1999 |
| WO | 2003037715 | 5/2003 |
| WO | 2008082335 | 7/2008 |
| WO | 2013154631 | 10/2013 |
| WO | 2014046713 | 3/2014 |
| WO | 2014092777 | 6/2014 |
| WO | 2014120125 | 8/2014 |

OTHER PUBLICATIONS

Dornheim, Michael A., Rolls-Royce Trent 1000 to Drive Boeing 787 Accessories From IP Spool, Aviation Week & Space Technology, Mar. 28, 2005, p. 51, Los Angeles, CA.
U.S. Appl. No. 15/232,101.
U.S. Appl. No. 14/964,984.
U.S. Appl. No. 14/967,446.
U.S. Appl. No. 15/069,197.
U.S. Appl. No. 15/269,014.
U.S. Appl. No. 15/373,072.
European Search Report for European Application No. 16166707.6 dated Sep. 26, 2016.
European Search Report for European Application No. 16166724.1 dated Sep. 26, 2016.
European Search Report for European Patent Application No. 16154635.3 dated Jul. 6, 2016.
European Search Report for European Application No. 16155316.9 completed Jun. 30, 2016.
European Search Report for Application No. 16170021.6 dated Oct. 11, 2016.
European Search Report for Application No. 16174862.9 dated Nov. 7, 2016.
European Search Report for European Application No. 16175531.9 dated Nov. 15, 2016.
European Search Report for European Application No. 16175533.5 dated Nov. 15, 2016.
European Search Report for European Application No. 16175552.5 dated Nov. 17, 2016.
European Search Report for European Application No. 16175760.4 dated Nov. 16, 2016.
European Search Report for Application No. 16178207.3 dated Nov. 21, 2016.
European Search Report for European Application No. 16202876.5 dated Apr. 24, 2017.
European Search Report for European Application No. 16180657.5 dated Dec. 16, 2016.
European Search Report for EP Application No. 17160816.9 dated Jul. 21, 2017.
European Search Report for EP Application No. 17200638.9 dated Mar. 29, 2018.
International Preliminary Report on Patentability for International Application No. PCT/US2017/060587 dated May 23, 2019.
European Search Report for EP Application No. 18205264.7 dated Apr. 4, 2019.

* cited by examiner

INTERCOOLED COOLED COOLING INTEGRATED AIR CYCLE MACHINE

BACKGROUND

This present disclosure relates to a gas turbine engine, and more particularly to improvements in providing cooling air from a compressor section to a turbine section in a gas turbine engine.

Gas turbine engines are known and typically include a fan delivering air into a bypass duct as propulsion air. Further, the fan delivers air into a compressor section where it is compressed. The compressed air passes into a combustion section where it is mixed with fuel and ignited. Products of this combustion pass downstream over turbine rotors driving them to rotate.

It is known to provide cooling air from the compressor to the turbine section to lower the operating temperatures in the turbine section and improve overall engine operation. Typically, air from the high compressor discharge has been tapped, passed through a heat exchanger, which may sit in the bypass duct and then delivered into the turbine section. The air from the downstream most end of the compressor section is at elevated temperatures.

Running the operating temperatures in the turbine section at high temperatures provides efficiency gains in the gas turbine engine; however, the high temperatures are exceeding material limits and are driving the need for improved cooling air. That is, conventional cooling air methods fail to provide cooling air at sufficient pressure to be introduced to the highest pressure places of the gas turbine engine and at cool enough temperature to reduce key component temperatures.

BRIEF DESCRIPTION

In accordance with one or more embodiments, an intercooled cooling system for a gas turbine engine is provided. The intercooled cooling system includes a plurality of cooling stages in fluid communication with an air stream utilized by the plurality of cooling stages for cooling. A first cooling stage of the plurality of cooling stages is fluidly coupled to a bleed port of a compressor of the gas turbine engine to receive and cool bleed air with the air stream to produce a cool bleed air. The intercooled cooling system includes a pump fluidly coupled to the first cooling stage to receive and increase a pressure of the cool bleed air to produce a pressurized cool bleed air. A second cooling stage of the plurality of cooling stages is fluidly coupled to the pump to receive and cool the pressurized cool bleed air to produce an intercooled cooling air. The intercooled cooling system includes an air cycle machine in fluid communication to outputs of the first and second cooling stages to selectively receive at least a portion of the cool bleed air or at least a portion of the intercooled cooling air.

In accordance with another embodiment or the intercooled cooling system embodiment above, the air cycle machine can comprise a turbine configured to receive and extract work from the portion of the cool bleed air or the portion of the intercooled cooling air.

In accordance with another embodiment or any of the intercooled cooling system embodiments above, the turbine can produce byproduct of cold air from the extraction of work from the portion of the cool bleed air or the portion of the intercooled cooling air.

In accordance with another embodiment or any of the intercooled cooling system embodiments above, the byproduct of cold air can be provided as a cooling sink for an environmental control system.

In accordance with another embodiment or any of the intercooled cooling system embodiments above, the air cycle machine can comprise a generator coupled to receive pneumatic power from the turbine.

In accordance with another embodiment or any of the intercooled cooling system embodiments above, the generator can provide electricity based on the pneumatic power to one or more of an electric heater, an auxiliary system, a motor drive, and an aircraft system.

In accordance with another embodiment or any of the intercooled cooling system embodiments above, the intercooled cooled cooling air system can comprise a first valve configured to selectively provide the cool bleed air to the air cycle machine; and a second valve configured to selectively provide the intercooled cooling air to the air cycle machine.

In accordance with another embodiment or any of the intercooled cooling system embodiments above, the bleed port can comprise a port at a low pressure location of the compressor or a port at a mid-pressure location of the compressor.

In accordance with another embodiment or any of the intercooled cooling system embodiments above, the plurality of cooling stages can be configured in a main bypass of the gas turbine engine to receive the air stream.

In accordance with another embodiment or any of the intercooled cooling system embodiments above, the plurality of cooling stages can be configured on a duct wall, and wherein the air stream comprises a combination of streams.

In accordance with another embodiment or any of the intercooled cooling system embodiments above, the intercooled cooling air can be outputted by the second cooling stage is mixed with second bleed air sourced from a second bleed port of the compressor.

In accordance with one or more embodiments, a gas turbine engine is provided. The gas turbine engine comprises a compressor section; a combustor section; a turbine section; and an intercooled cooling system for a gas turbine engine. The intercooled cooling system comprises a plurality of cooling stages in fluid communication with an air stream utilized by the plurality of cooling stages for cooling. A first cooling stage of the plurality of cooling stages is fluidly coupled to a bleed port of a compressor of the gas turbine engine to receive and cool bleed air with the air stream to produce a cool bleed air. The intercooled cooling system comprises a pump fluidly coupled to the first cooling stage to receive and increase a pressure of the cool bleed air to produce a pressurized cool bleed air. A second cooling stage of the plurality of cooling stages is fluidly coupled to the pump to receive and cool the pressurized cool bleed air to produce an intercooled cooling air. The intercooled cooling system comprises an air cycle machine in fluid communication to outputs of the first and second cooling stages to selectively receive at least a portion of the cool bleed air or at least a portion of the intercooled cooling air.

In accordance with another embodiment or the gas turbine engine embodiment above, the air cycle machine can comprise a turbine configured to receive and extract work from the portion of the cool bleed air or the portion of the intercooled cooling air.

In accordance with another embodiment or any of the gas turbine engine embodiments above, the turbine can produce a byproduct of cold air from the extraction of work from the portion of the cool bleed air or the portion of the intercooled cooling air.

In accordance with another embodiment or any of the gas turbine engine embodiments above, the byproduct of cold air can be provided as a cooling sink for an environmental control system.

In accordance with another embodiment or any of the gas turbine engine embodiments above, the air cycle machine can comprise a generator coupled to receive pneumatic power from the turbine.

In accordance with another embodiment or any of the gas turbine engine embodiments above, the generator can provide electricity based on the pneumatic power to one or more of an electric heater, an auxiliary system, a motor drive, and an aircraft system.

In accordance with one or more embodiments, a method of providing bleed air to an air cycle machine is provided. The method comprises cooling a bleed air flow in the first cooling stage to produce a cooled bleed air flow; increasing a pressure of the cooled bleed air flow in the pump to produce a pressurized cooled bleed air flow; cooling the pressurized cooled bleed air flow in the first second exchanger to produce an intercooled cooling air; and selectively receiving at least a portion of the cool bleed air or at least a portion of the intercooled cooling air by the air cycle machine that is in fluid communication with outputs of the first and second cooling stages.

In accordance with another embodiment or any of the method embodiments above, the method can comprise extracting work from the portion of the cool bleed air or the portion of the intercooled cooling air by a turbine of the air cycle machine to produce pneumatic power; and generating electricity by a generator coupled to the turbine based on the pneumatic power.

In accordance with another embodiment or any of the method embodiments above, the generator can provide electricity based on the pneumatic power to one or more of an electric heater, an auxiliary system, a motor drive, and an aircraft system.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
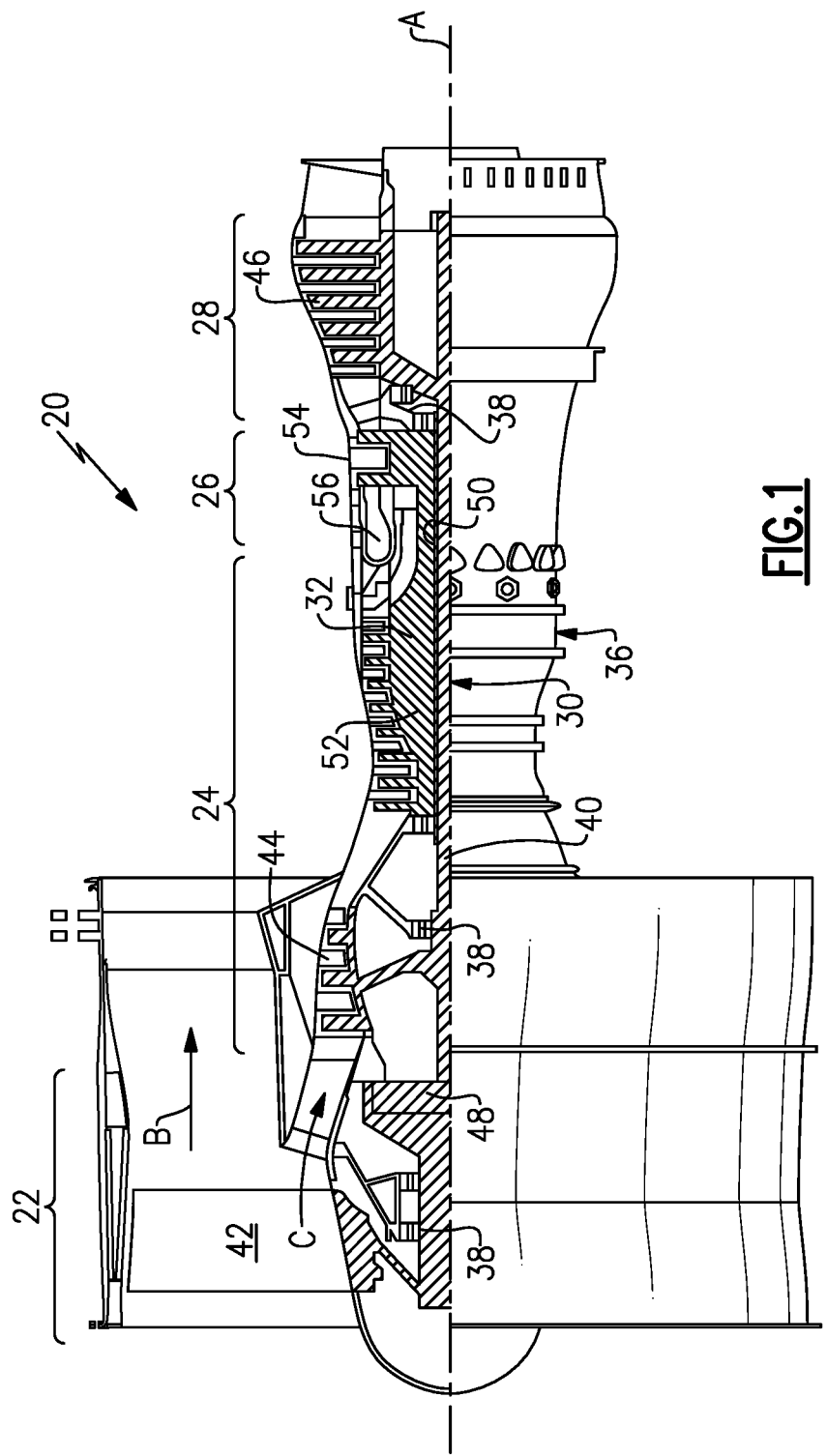
FIG. 1 schematically shows an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

Figure 2:
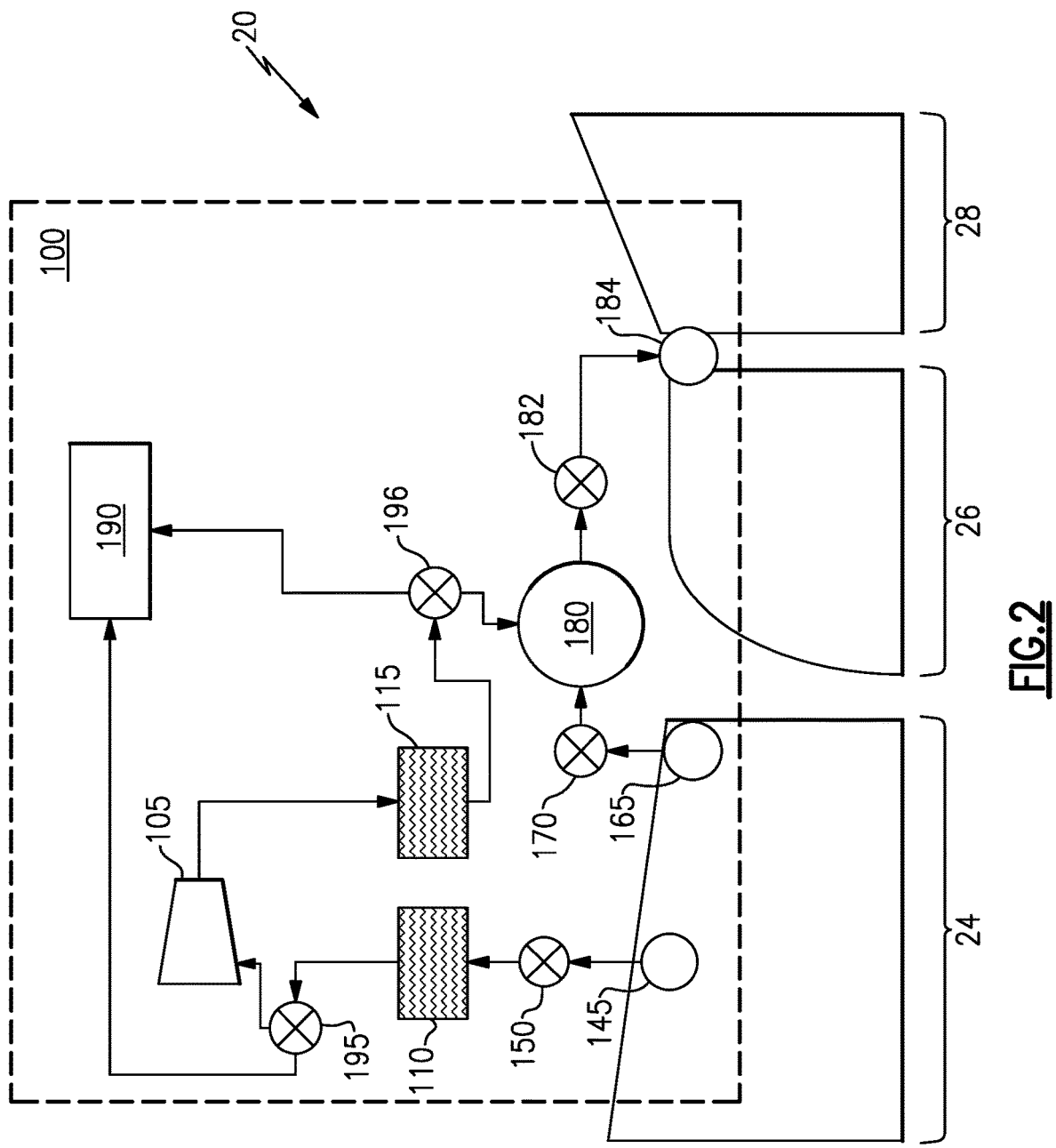
FIG. 2 is an intercooled cooled cooling air system in accordance with an embodiment.

Turning now to FIG. 2, an intercooled cooled cooling air system 100 is provided in accordance with an embodiment. In general, the intercooled cooled cooling air system 100 comprises a staged cooling arrangement coupled to an air cycle machine. The stages cooling arrangement can comprise one or more heat exchangers for each stage. In operation, bleed air from a first compressor is put through a first stage of the staged cooling arrangement (e.g., a first heat exchanger or set of heat exchangers). The flow is collected and run through a second compressor to pump it up. The discharge of the second compressor is then run through a second stage of the staged cooling arrangement (e.g., a second heat exchanger or set of heat exchangers) before being delivered as intercooled cooled cooling air. The air cycle machine can selectively receive a percentage or portion of the cooling air from the staged cooling arrangement (e.g., bleed air running through the inter-cooled loop). The air cycle machine can utilize the received cooling air to provide pneumatic power to an accessory with a byproduct being cool/cold air.

The intercooled cooled cooling air system 100 is in fluid communication with bleed air of a gas turbine engine 20, which is illustrated schematically in FIG. 2. A non-limiting gas turbine engine 20 is described and illustrated in FIG. 1. Components of the gas turbine engine 20 that are similar to the gas turbine engine 20 of FIG. 1 have been reused for ease of explanation, by using the same identifiers, and are not re-introduced. As shown in FIG. 2, components of the environmental control system 100 comprise a pump 105 and at least one heat exchanger as the staged cooling arrangement. In one non-limiting embodiment, the at least one heat exchanger may comprise a first heat exchanger 110 (a first cooling stage) and a second heat exchanger 115 (a second cooling stage). Components of the environmental control system 100 may also comprise a first port 145, a valve 150, a second port 165, a valve 170, a demarcation or mixing chamber 180, a valve 182, a port 184, an air cycle machine 190, a valve 195, and a valve 196.

As shown in FIG. 2, the pump 105, the first heat exchanger 110, and the second heat exchanger 115 are in fluid communication with bleed air of the gas turbine engine 20. Bleed air (e.g., a first bleed air flow) can be extracted from a first port 145 of the compressor section 24 of the gas turbine engine 20, as regulated by a valve 150. Bleed air (e.g., a second bleed air flow) can also be extracted from a second port 165 of the compressor section 24 of the gas turbine engine 20, as regulated by a valve 170. These portions can be mixed, as noted by demarcation 180, before being sent through a valve 182 to a third port 184 of the turbine section 28 of the gas turbine engine 20. Further, the air cycle machine 190 is in fluid communication with outputs of the first heat exchanger 110 and the second heat exchanger 115, as respectively regulated by the valve 195 and the valve 196.

A heat exchanger (e.g., the first heat exchanger 110 and a second heat exchanger 115) is a device built for efficient heat transfer from one medium to another. Examples of heat exchangers include circular, double pipe, shell and tube, plate, plate and shell, adiabatic wheel, plate fin, pillow plate, and fluid heat exchangers.

The pump 105 (along with the compressor section 24) is a mechanical device built to raise a pressure of a medium. The compressor section 24, particularly, receives a medium (e.g., fresh atmospheric air) that flows through the compressor, which brings the medium to higher pressure. The pump 105 can raise the pressure of air bled from the compressor section 24. Examples of pumps and compressors include turbines, impellers, centrifugal compressors, diagonal or mixed-flow compressors, axial-flow impellers, reciprocating devices, ionic liquid piston devices, rotary screw compressors, rotary vane compressors, scroll compressors, diaphragm compressors, air bubble compressors, etc. Further, the pump 105 can be driven by a motor or a medium. In a non-limiting embodiment, the pump 105 can be an impeller.

The combustor section 26 can comprise a diffuser and a combustor to enable combustion of the medium. The combustor is a component or area of the gas turbine engine 20 where combustion takes place. Combustion comprises when energy is added to a medium received from the compressor section 24, which is at the higher pressure, by spraying fuel into the medium and igniting the fuel (so the combustion generates a high-temperature flow of the medium). The diffuser is a component that slows the medium from the compressor section 24 (e.g., the high speed, highly compressed air) to a velocity optimal for combustion.

The turbine section 28 extracts energy from a medium flow. For example, the turbine of the turbine section 28 is a rotary mechanical device that expands a medium received from the diffuser and combustor of the combustor section 26 down to an exhaust pressure to produce thrust.

Bleed ports are apertures that allow for a medium to be bled from the compressor section 24 (i.e., a compressor stage of the gas turbine engine 20, upstream of the combustor section 26) and may be located anywhere along the compressor section 24 (e.g., anywhere along the low pressure compressor 44 and the high pressure compressor 52 of FIG. 1). A temperature, a humidity, and a pressure of a bleed medium, also referred to as bleed air, varies depending upon a compressor stage and a revolutions per minute of the gas turbine engine 20. In a non-limiting embodiment, a plurality of bleed ports are represented by the first port 145 and the second port 165. The first port 145 can be a low pressure bleed port that is located towards an intake side of the compressor (e.g., the low pressure compressor 44) of the compressor section 24, where the pressure of the air is at or near atmospheric pressure. The second port 165 can be a high pressure bleed port that is located towards an exhaust side of the compressor (e.g., the high pressure compressor 52) of the compressor section 24, where the pressure of the air is at or near combustion pressure. The first port 145 can also be located at a mid-compressor bleed location, where the pressure of the air is between atmospheric pressure and combustion pressure. In contrast to the first port 145 and the second port 165, the third port 184 is an aperture that allows for a medium to be supplied to the gas turbine engine 20. In a non-limiting embodiment, the third port 184 is shown as being located at or near an intake of the turbine section 28 (downstream of the combustor section 26).

The valves 150, 170, 182, 195, and 196 are devices that regulate, direct, and/or control a flow of a medium by opening, closing, or partially obstructing various passageways within the tubes, pipes, etc. of the intercooled cooled cooling air system 100. Valves 150, 170, 182, 195, and 196 can be operated by actuators, such that flow rates of the medium in any portion of the intercooled cooled cooling air system 100 can be regulated to a desired value. Examples of valves 150, 170, 182, 195, and 196 include a flow regulation device or a mass flow valve. In a non-limiting embodiment, the valve 195 and the valve 196 can be operated by a control system coupled to the intercooled cooled cooling air system 100 to selectively regulate percentages or portions of bleed air flowing to the air cycle machine 190 (by controlling the actuators that manage the operations of the valve 195 and the valve 196). In another non-limiting embodiment, the valve 150 can be a shut off or modulated valve and can require a check; the valve 195 can divert flow after a first cooling stage as a cooling source or direct cool air supply; the valve 196 can split flow between air cycle machine or some other bleed demand; the valve 170 can modulate uncooled "mixing" bleed to cooled cooling air; and the valve 182 can control cooled cooling air flow or direct where the flow is going.

A mixing point is a location within the intercooled cooled cooling air system 100 where multiple medium and/or multiple medium flows are combined. In a non-limiting embodiment, the demarcation 180 marks a mixing point between the first bleed air flow and the second bleed air flow.

The air cycle machine 190 is a mechanical device that includes components for performing thermodynamic work on the medium (e.g., extracts or works on the medium by raising and/or lowering pressure and by raising and/or lowering temperature). Examples of the air cycle machine 190 include a two-wheel, a three-wheel machine, a four wheel-machine, etc.

The intercooled cooled cooling air system 100 comprises improvements in providing cooling air from the compressor section 24 to the turbine section 28 in the gas turbine engine 20. Embodiments of these improvements include a cooling-pumping-cooling operation, pumping-cooling-cooling operation, and cooling-cooling-pumping operation. An example the cooling-pumping-cooling operation of the intercooled cooled cooling air system 100 will now be described.

In the case where an operating temperature in the turbine section 26 the gas turbine engine 20 is at a high temperature (at or exceeding material limits), air can be bled from the first port 145 by the value 150, operated by an actuator, of the intercooled cooled cooling air system 100. This air can be referred to as bleed air (e.g., a first bleed air flow). Further, air can be bled from the second port 165 by the value 170, operated by an actuator, of the intercooled cooled cooling air system 100. This air can also be referred to as bleed air (e.g., a second bleed air flow). In the example cooling-pumping-cooling operation, the bleed air that is described as being extracted from the first port 145 at the low pressure portion of the compressor section 24 to produce low pressure bleed air, and the air that is extracted from the second port 145 at the high pressure portion of the compressor section 24 can be high pressure bleed air. Note that the pressure of the air is generally the same at an exhaust of the compressor section 24 and at an intake of the turbine section 28 because there is a minimal amount of pressure loss when going through the combustor section 26.

The low pressure bleed air from the first port 145 can be supplied to the staged cooling arrangement of the intercooled cooled cooling air system 100. As shown in FIG. 2, the low pressure bleed air passes through the first heat exchanger 110, where it is cooled to produce cool low pressure bleed air (cooling). The cool low pressure bleed air is then supplied to the pump 105, which pressurizes the cool low pressure bleed air to produce cool high pressure bleed air (pumping). The cool low pressure bleed air can also be supplied to the air cycle machine 190 (via vale 195), which can receive any percentage or portion of the cool low pressure bleed air. In an embodiment, an inlet of the air cycle machine 190 can be in fluid communication with bleed air that is upstream of the pump 105 and downstream of the first heat exchanger 210. As shown in FIG. 2, the inlet can be represented as the valve 195, which selectively regulate the bleed air to the air cycle machine 190.

Next, the cool high pressure bleed air passes through the second heat exchanger 115, where it is further cooled to produce the cooled cool high pressure bleed air (cooling). The cool high pressure bleed air can also be supplied to the air cycle machine 190 (via valve 196), which can receive any percentage or portion of the cool high pressure bleed air. The cooled cool high pressure bleed air from the staged cooling arrangement can then be mixed at the demarcation point 180 with the high pressure bleed air from the second port 165 to produce intercooled cooled cooling air. In an embodiment, an inlet of the air cycle machine 190 can be in fluid communication with bleed air that is upstream of the demarcation 180 and downstream of the second heat exchanger 210. As shown in FIG. 2, the inlet can be represented as the valve 196, which selectively regulate the bleed air to the air cycle machine 190.

The air cycle machine 190 can utilize the received cool low pressure bleed air and/or cool high pressure bleed air respectively received from the exhausts of the first heat exchanger 110 and the second heat exchanger 115 to provide pneumatic power to an accessory. By providing the pneumatic power, the air cycle machine 190 can also produce byproduct of cool/cold air. The air cycle machine 190 is one example of a device that can receive cool low pressure bleed air and/or cool high pressure bleed air and is not intended to be limiting.

Note that the act of cooling by the first heat exchanger 110 can cause a pressure drop on the bleed air. In this way, the first heat exchanger 110 can be configured to offset a performance of the pump 105. Further, the pump 105 can be configured to pressurize the air to at, slightly above, or considerably above the pressure at the exhaust of the compressor section 24 to compensate for an original low pressure at the first port 145 and/or for the pressure drop across the staged cooling arrangement. Furthermore, the second heat exchanger can be configured to cool the air exhausted from the pump 105 back down.

Figure 3:
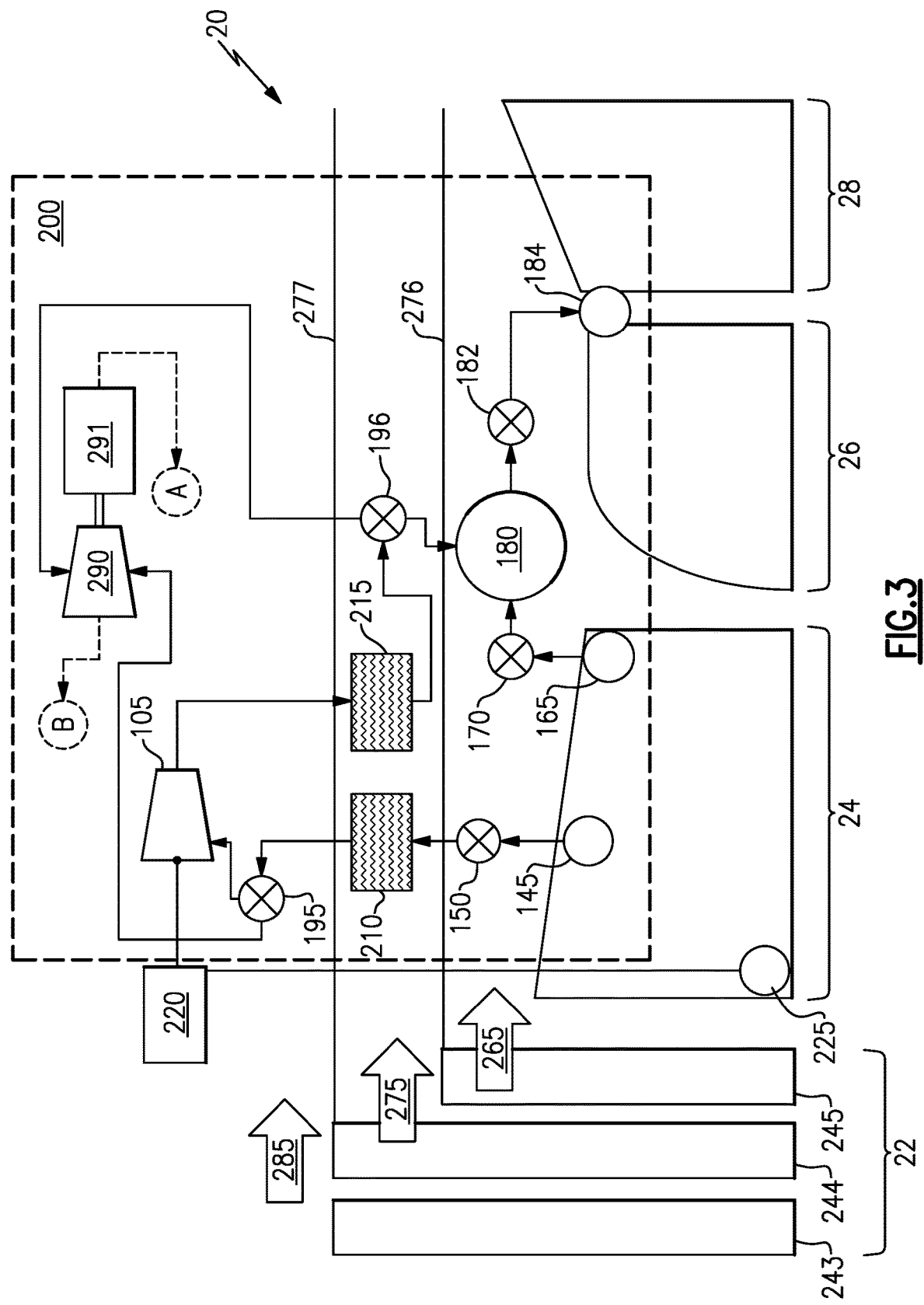
FIG. 3 is an intercooled cooled cooling air system with an integrated air cycle machine in accordance with another embodiment.

FIG. 3 is an intercooled cooled cooling air system 200 in accordance with another embodiment. In general, the intercooled cooled cooling air system 200 comprises a staged cooling arrangement located in a bypass duct of the gas turbine engine 20. Components of the intercooled cooled cooling air system 100 and the gas turbine engine 20 that are similar to the intercooled cooled cooling air system 200 have been reused for ease of explanation, by using the same identifiers, and are not re-introduced. Components of the environmental control system 200 comprise a first heat exchanger 210, a second heat exchanger 215, a gearbox 220, a bleed port 225, and a fan section 22 comprising a plurality of fans. In a non-limiting embodiment, the fan section 22 comprises a first fan 230, a second fan 235, and a third fan 240. Components of the environmental control system 200 also comprise one or more bypass streams encased by ducts. In an embodiment and as shown in FIG. 3, a main bypass stream 265 (fan 245) and a secondary bypass stream 275 (fans 243 and 244) are isolated within first and second bypass ducts of the gas turbine engine 20 (by a first duct wall 276 and a second duct wall 277). A third bypass stream 285 can be located in a third bypass duct external to the second bypass duct, but within a casing of the gas turbine engine 20 (e.g., located in an outer duct that bypasses the fan section 22). The intercooled cooled cooling air system 200 is also integrated with a pump 290 and an electric generator 291.

As shown in FIG. 3, the first heat exchanger 210 and the second heat exchanger 215 are aligned in the secondary bypass stream 275 to enable the stream to act as the heat sink for the bleed air flow from the first port 145. Within the secondary bypass stream 275, the first heat exchanger 210 is upstream of the second heat exchanger 215. Alternative embodiments include collectively aligning the first heat exchanger 210 and the second heat exchanger 215 in the main bypass stream 265, collectively aligning the first heat exchanger 210 and the second heat exchanger 215 in the third bypass stream 285, collectively aligning the first heat exchanger 210 and the second heat exchanger 215 on the first duct wall 276 (e.g., to enable a combination of streams the main bypass stream 265 and the secondary bypass stream 275), and collectively aligning the first heat exchanger 210 and the second heat exchanger 215 on the second duct wall 277 (e.g., to enable a combination of streams the secondary bypass stream 275 and the third bypass stream 285). Alternative embodiments also include separately aligning the first heat exchanger 210 and the second heat exchanger 215 in different streams 275, 285, and 295 and/or on different duct walls 276 and 277. Further, embodiments can include utilizing one or more sources for a heat sink, such as bleed air, fluid cooling, air cycle machine cooling, etc., in lieu of or in addition to the streams described herein.

The pump 290 can selectively receive cool low pressure bleed air and/or cool high pressure bleed air respectively received from the exhausts of the first heat exchanger 110 and the second heat exchanger 115 regardless of their location. In a non-limiting embodiment, the pump 290 can be a turbine. Selective regulation can be implemented by operations of the valve 195 and the valve 196, which can operate in response to operating conditions of the gas turbine engine 20 and/or other systems (e.g., an electric heater powered by the generator 291 requires more power, and therefore a higher percentage or portion of bleed air is supplied by the valve 195 and/or valve 196 to generate that power). Embodiments of selective regulation include the pump 290 receiving bleed air from only the valve 195; the pump 290 receiving bleed air from only the valve 196; the pump 290 receiving bleed air from both the valve 195 and the valve 196; the pump 290 receiving proportional bleed air from the valve 195 and the valve 196; etc.

The pump 290 can extract work from the cool low pressure bleed air and/or the cool high pressure bleed air to provide pneumatic power to the generator 291. By providing the pneumatic power to the generator 291, the generator 291 can produce electricity to power one or more applications (see dash-arrow pointing to dashed-circle A). Examples of application include electricity to provide heat to diffuser (e.g., electric heater); providing thermo-electricity to an auxiliary system; electricity to provide shaft power (e.g., gearbox generator, motor drive, pump, etc.); electricity to provide aircraft power (e.g., aircraft system); etc. The work extracted by the pump produces byproduct of cool/cold air that can be a cooling sink for one or more applications elsewhere in the gas turbine engine 20 or aircraft (see dash-arrow pointing to dashed-circle B). In an embodiment, the one or more applications include providing the cooling sink to an environmental control system of an aircraft.

Also, as shown in FIG. 3, the gear box 220 can be fluidly coupled to bleed port 225. The gear box 220 can, in turn, be power by extracted from bleed air sourced from the bleed port 225 to drive the pump 105 (e.g., cause the pump to compress bleed air received from the first heat exchanger 210). In another non-limiting embodiment, the gear box 220 can be representative of an electric motor that powers the pump 105.

Technical effect and benefits of an intercooled cooled cooling air system include producing a cold heat sink and/or cool flow from direct cooling, where a two heat exchanger configuration further provides variable options for the pressure and temperature of the cooling Technical effect and benefits of an intercooled cooled cooling air system include producing a variable speed, variable power off-take to be used on an accessory like generator.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:
1. A gas turbine engine, comprising:
a compressor section;
a combustor section;
a turbine section; and
an intercooled cooling system for the gas turbine engine, the intercooled cooling system comprising:

a plurality of heat exchangers in fluid communication with an air stream utilized by the plurality of heat exchangers for cooling, wherein a first heat exchanger of the plurality of heat exchangers is fluidly coupled to a first bleed port of the compressor section to receive and cool bleed air with the air stream to produce a cool bleed air;

a pump fluidly coupled to the first heat exchanger to receive and increase a pressure of the cool bleed air to produce a pressurized cool bleed air, wherein a second heat exchanger of the plurality of heat exchangers is fluidly coupled to the pump to receive and cool the pressurized cool bleed air to produce an intercooled cooling air;

an air cycle machine in fluid communication to outputs of the first and second heat exchangers to selectively receive at least a portion of the cool bleed air or at least a portion of the intercooled cooling air;

a first valve configured to selectively provide the cool bleed air to the air cycle machine without passing through the second heat exchanger, a second valve configured to selectively provide the intercooled cooling air to the air cycle machine, and a third valve configured to selectively provide the intercooled cooling air to the turbine section, wherein said second valve selectively delivers the intercooled cooling air to the air cycle machine and to the third valve, and wherein air delivered from said second valve towards said third valve passes into a mixing chamber, and a second bleed port from said compressor section delivers air into said mixing chamber to mix with said intercooled cooling air before reaching said third valve.

2. The gas turbine engine of claim 1, wherein the first bleed port comprises a port at a low pressure location of the compressor section or a port at a mid-pressure location of the compressor section.

3. The gas turbine engine of claim 1, wherein the first and second heat exchangers are positioned in a main bypass of the gas turbine engine to receive the air stream.

4. The gas turbine engine of claim 1, wherein the air cycle machine comprises an air cycle turbine configured to receive and extract work from the portion of the cool bleed air or the portion of the intercooled cooling air.

5. The gas turbine engine of claim 1, wherein the air cycle turbine produces a byproduct of cold air from the extraction of work from the portion of the cool bleed air or the portion of the intercooled cooling air.

6. The gas turbine engine of claim 5, wherein the byproduct of cold air is provided as a cooling sink for an environmental control system.

7. The gas turbine engine of claim 1, wherein the air cycle machine comprises a generator coupled to receive pneumatic power from an air cycle turbine.

8. The gas turbine engine of claim 7, wherein the generator provides electricity based on the pneumatic power to one or more of an electric heater, an auxiliary system, a motor drive, and an aircraft system.

9. The gas turbine engine as set forth in claim 1, wherein a fourth valve is positioned between said second bleed port and said mixing chamber to selectively allow or block flow from said second bleed port to said mixing chamber.

* * * * *